Patented Oct. 17, 1939

2,176,421

UNITED STATES PATENT OFFICE 2,176,421

COMPOUNDS OF THE COERANTHRENE AND COERBIANTHRENE SERIES

Heinrich Hopff, Ludwigshafen-on-the-Rhine, and Karl Heymann, Mannheim, Germany, assignors to General Aniline Works, Inc., New York, N. Y., a corporation of Delaware No Drawing. Application September 13, 1935, Serial No. 40,411. In Germany October 5, 1934

4 Claims. (Cl. 260—335)

The present invention relates to compounds of the coeranthrene and coerbianthrene series and a process of producing same.

Compounds of the coeranthrene and coerbianthrene series have hitherto been prepared by reduction of the corresponding coeroxonol or coeroxenol compounds with hydrogen iodide in the presence of phosphorus. This method of working is not used in practice by reason of the expensive use of hydrogen iodide, especially as the resulting products are obtained in an impure form.

We have now found that compounds of the coeranthrene and coerbianthrene series can be obtained very smoothly in a pure form by treating the corresponding coeroxonols or coeroxenols with reactive hydrogen. This treatment may consist in an action of gaseous hydrogen in the presence of catalysts or in an electrolytic reduction or in a reduction by nascent hydrogen in an alkaline medium. The said processes may be carried out at ordinary or increased temperature, as for example at from 60° to 120° C., if desired under superatmospheric pressure.

The procedure may be, for example, that the said initial materials are treated in the presence of solvents or diluents, as for example cyclohexane, tetrahydronaphthalene, decahydronaphthalene or hexane, with hydrogen in the presence of hydrogenation catalysts, such as finely divided nickel, copper, cobalt, palladium, or platinum, as such or in admixture with each other or with other substances, as for example activators, such as zinc, manganese, aluminium, or iron at elevated temperature, if desired under superatmospheric pressure. The coeroxonols or coeroxenols may also be treated in an alkaline medium with energetic reducing agents which develop nascent hydrogen, as for example with aluminium, zinc, tin or lead in the presence of caustic alkaline solutions or ammonia. In many cases it is advantageous to add organic solvents, such as alcohol or acetone, to the reducing agents which develop nascent hydrogen. Electrolytic reduction in an alkaline medium also yields good results.

The reaction products are obtained in a state of great purity.

The following examples will further illustrate how the said invention may be carried out in practice but the invention is not restricted to these examples. The parts are by weight.

Example 1

5 parts of 4,14-dimethylcoeroxonol which has the formula

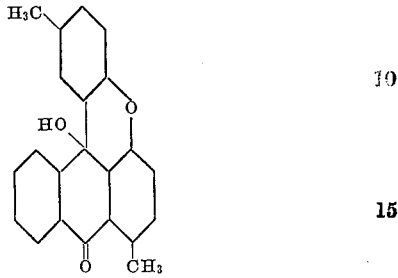

are suspended while stirring in 50 parts of about 20 per cent caustic soda solution. 15 parts of zinc dust and, if desired, 20 parts of ethyl alcohol are then added and the whole heated to boiling for five hours. The end of the reaction becomes evident by the fact that the originally red colored solution becomes markedly paler. The mixture of excess zinc dust and the reduction product is filtered by suction and the latter isolated by extraction with organic solvents. It is a yellow-brown product which dissolves in concentrated sulphuric acid giving a red coloration.

A similar procedure is followed when employing coeroxonol instead of dimethylcoeroxonol. Instead of zinc dust, aluminium powder may be employed.

Example 2

5 parts of purified coeroxonol which has the formula

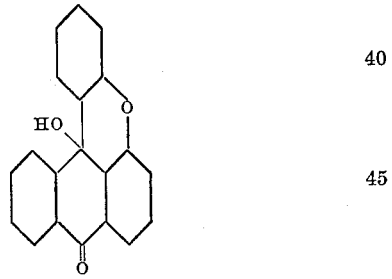

are suspended in 100 parts of cyclohexane, 1 part of very finely divided nickel powder is added and the whole heated at 100° C. with hydrogen under a pressure of 100 atmospheres for four hours. The deeply colored reduction product is worked up in the usual manner.

Instead of nickel, other suitable hydrogenation catalysts, as for example platinum, palladium, cobalt or copper may be used either alone or in admixture with each other.

*Example 3*

5 parts of the dimethylcoeroxenol employed as starting material in Example 1 are suspended in 100 parts of an about 20 per cent aqueous caustic soda solution. This suspension is then subjected to an electrolytic reduction at 0.02 ampere per square centimeter until the initial substance has wholly disappeared. After working up in the usual manner, the reduction product is obtained in the form of a finely divided orange powder which is very readily soluble in organic solvents especially in benzene giving a beautiful green fluorescence.

What we claim is:

1. A process of producing compounds of the coeranthrene and coerbianthrene series which comprises acting on a compound of the class consisting of coeroxonols and coeroxenols with nascent hydrogen produced in an alkaline medium until compounds practically insoluble in alkali are obtained.

2. A process of producing compounds of the coeranthrene and coerbianthrene series which comprises acting on a compound of the class consisting of coeroxonols and coeroxenols with nascent hydrogen produced by means of a metal in an alkaline medium until compounds practically insoluble in alkali are obtained.

3. A process of producing compounds of the coeranthrene and coerbianthrene series which comprises acting on a compound of the class consisting of coeroxonols and coeroxenols with nascent hydrogen produced by means of zinc in an alkaline medium until compounds practically insoluble in alkali are obtained.

4. A process of producing compounds of the coeranthrene and coerbianthrene series which comprises acting on a compound of the class consisting of coeroxonols and coeroxenols to electrolytic reduction with nascent hydrogen produced by electrolysis in an alkaline medium until compounds practically insoluble in alkali are obtained.

HEINRICH HOPFF.
KARL HEYMANN.